Patented Nov. 1, 1949

2,486,658

UNITED STATES PATENT OFFICE 2,486,658

PROCESS FOR PREPARING POLYPHOSPHORIC ACID ESTERS

Gennady M. Kosolapoff, Dayton, Ohio, assignor to Monsanto Chemical Company, St. Louis, Mo., a corporation of Delaware No Drawing. Application April 25, 1947, Serial No. 744,036

12 Claims. (Cl. 260—461)

This invention provides a process for preparing esters of polyphosphoric acid by reacting dialkyl chlorophosphate with trialkyl phosphate under conditions whereby alkyl chloride is liberated. By means of the present invention any alkyl ester of a polyphosphoric acid wherein the alkyl group has from 2 to 18 carbon atoms may be prepared by a simple and efficient process.

The general formula of the alkyl esters prepared by the present process is:

$$(RO)_{n+2} P_n O_{2n-1}$$

where $n$ is at least 2 and R is an alkyl radical having from 2 to 18 carbon atoms.

The products produced by the present process may also be considered as esters of molecularly dehydrated phosphoric acids. That is, they are esters of acids having less water in the molecule than does orthophosphoric acid.

In general, the reaction is carried out by heating a mixture of dialkyl chlorophosphate and a trialkyl phosphate to a temperature at which alkyl chloride is formed. Substantially all of the chlorine in the dialkyl chlorophosphate may be recovered as an alkyl chloride. Simultaneously an alkyl ester of a polyphosphoric acid is also formed. Heating of the mixture may be carried out under atmospheric pressure or under diminished pressure. However, operation under a vacuum is generally preferred in order that the alkyl chloride may be more easily removed. In place, however, of removing the alkyl chloride by distillation, it is also practical to separate the alkyl chloride from the polyphosphoric acid ester by a solvent extraction process. The temperature employed during the heating step is generally in the range of above 100° C. and not above 150° C.

According to the present process any alkyl ester of a polyphosphoric acid having the above general formula may be made. For most uses of the polyphosphoric acid esters such, for example, as the preparation of insecticidal compositions or plasticizers, the value of $n$ in the above formula may be restricted to 8. The products produced include the following known esters of polyphosphoric acid:

Tetraalkyl pyrophosphate: $(RO)_4 P_2 O_3$
Pentaalkyl triphosphate: $(RO)_5 P_3 O_5$
Hexaalkyl tetraphosphate: $(RO)_6 P_4 O_7$ as well as the following more complex polyphosphoric acid esters:

Heptaalkyl pentaphosphate: $(RO)_7 P_5 O_9$
Octaalkyl hexaphosphate: $(RO)_8 P_6 O_{11}$
Nonaalkyl heptaphosphate: $(RO)_9 P_7 O_{13}$
Decaalkyl octaphosphate: $(RO)_{10} P_8 O_{15}$ While I do not completely understand the theory governing the reactions herein disclosed, it appears that the process involves a condensation reaction resulting in the formation of an alkyl chloride, which process, in the case of the preparation of tetraalkyl pyrophosphate, may be written as follows:

1. $(RO)_2POCl + (R'O)_3P=O \longrightarrow$
$$(RO)_2-\underset{\underset{O}{\|}}{P}-O-\underset{\underset{O}{\|}}{P}-(R'O)_2 + R'Cl$$

where R and R' are alkyl radicals having from 2 to 18 carbon atoms. R' may be the same as R or different. The present process, therefore, includes a means for producing the neutral, simple, or the mixed tetraalkyl esters of pyrophosphoric acid.

The pentaalkyl triphosphate may be similarly prepared by reacting two mols of a dialkyl chlorophosphate with one mol of trialkyl phosphate in the following manner:

2. $2(RO)_2POCl + (RO)_3PO \rightarrow (RO)_5P_3O_5 + 2RCl$

The hexaalkyl tetraphosphate is obtained by reacting three mols of a dialkyl chlorophosphate with one mol of a trialkyl phosphate as follows:

3. $3(RO)_2POCl + (RO)_3P=O \rightarrow (RO)_6P_4O_7 + 3RCl$

When four mols of a dialkyl chlorophosphate are heated together with one mol of a trialkyl phosphate a heptaalkyl pentaphosphate is formed.

4. $4(RO)_2POCl + (RO)_3P=O \rightarrow (RO)_7P_5O_9 + 4RCl$

When five mols of a dialkyl chlorophosphate are reacted with one mol of a trialkyl phosphate an octaalkyl hexaphosphate is formed.

5. $5(RO)_2POCl + (RO)_3P=O \rightarrow (RO)_8P_6O_{11} + 5RCl$

Similarly six mols of a dialkyl chlorophosphate when reacted with one mol of trialkyl phosphate gives a nonaalkyl heptaphosphate according to the following reaction:

6. $6(RO)_2POCl + (RO)_3PO \rightarrow (RO)_8P_6O_{11} + 6RCl$

In a similar fashion 8 mols of the dialkyl chlorophosphate may be reacted with one mol of a trialkyl phosphate.

The removal of the alkyl chloride produced in the above reactions may be achieved by any desired method. Since the alkyl chloride formed in the reaction generally boils below the boiling point of the polyphosphoric acid ester, recourse may usually be had to simple distillation. Since, however, the esters have a tendency to decompose at temperatures above 150° C., it is desirable not to heat the mixture above about 150° during such distillation. By employing vacuum distillation an adequate separation may usually be made.

The dialkyl chlorophosphate used in my process may be prepared by chlorination of a dialkyl phosphite as disclosed in U. S. 2,409,039, issued to Edgar E. Hardy and myself on October 8, 1946. By employing the procedure described in the above patent any dialkyl chlorophosphate may be prepared cheaply and in a good yield. The dialkyl chlorophosphate may be obtained either in a crude or in a pure stabilized form, although for the present purpose it need not be especially purified beyond removal of any hydrogen chloride which may be present in the product. Since the presence of hydrogen chloride in the above reaction is undesirable, the reactants employed in the process should be "sweetened" by the means disclosed in the U. S. patent mentioned above, or by other means.

The mixture of dialkyl chlorophosphate and trialkyl phosphate employed in the above reactions may be made by mixing together the constituents thereof in the proportions desired. In the preparation of tetraalkyl pyrophosphate in high yields, it is desirable to use an excess of triethyl phosphate to suppress the further condensation. A 2:1 mol ratio is satisfactory for the preparation of the tetraalkyl pyrophosphate in good yields. Since the dialkyl chlorophosphate may be made by the reaction of two moles of an alcohol with one mol of POCl₃ and the trialkyl phosphate may be made by the reaction of three mols of alcohol with one mol of POCl₃, it is possible to make a mixture of the desired reactants in the following way:

Five mols of an alcohol are gradually added to two mols of POCl₃ with efficient stirring, the temperature being maintained below 25° C. and preferably below 10° C. Hydrogen chloride is formed in the reaction and may be substantially completely removed by subjecting the mixture to a vacuum or by evaporation of a portion of the solvent present (if one is employed). The mixture should not be heated above about 25° C. and preferably not above 10° C. while any substantial quantities of hydrogen chloride remain in the mixture. Under these conditions the following reaction is believed to take place:

7. 5ROH+2POCl₃→(RO)₃PO+(RO)₂POCl+5HCl

Upon heating the so-formed mixture of trialkyl phosphate and dialkyl chlorophosphate to 130° C. to 150° C. (after HCl has been substantially completely removed) a good yield of tetraalkyl pyrophosphate is obtained according to the process illustrated by Reaction 1 above.

The alcohols which may be used in the process of Reaction 7 above may be any of the following, or mixtures thereof, the mixtures being employed in any proportions depending upon the particular ester desired.

Ethyl alcohol
n-Propyl alcohol
Isopropyl alcohol
n-Butyl alcohol
Isobutyl alcohol
n-Amyl alcohol
Isoamyl alcohol
n-Hexyl alcohol
2-ethyl butyl alcohol
Heptyl alcohol
n-Octyl alcohol
2-ethyl hexyl alcohol
Capryl alcohol
n-Decyl alcohol
Lauryl alcohol
Myristyl alcohol
Cetyl alcohol
Stearyl alcohol The following examples serve to further illustrate my process:

*Example 1*

One-half gram mol of diethyl chlorophosphate was mixed with one-half gram mol of triethyl phosphate and then heated with stirring to 130° C. when ethyl chloride evolution began. The temperature was slowly raised to 150° C., at which temperature the evolution of ethyl chloride ceased. The total time for evolution of the ethyl chloride was about three hours. Vacuum distillation of the residual product gave 73 grams of a forerun as triethyl phosphate and 81 grams of product which boiled at about 110° C. at 0.02 mm. This product was tetraethyl pyrophosphate.

*Example 2*

One gram mol of diethyl chlorophosphate was mixed with 1.5 gram mols of triethyl phosphate and then while stirring the mixture was heated to 135° C. for a period of four hours. During the heating period ethyl chloride is evolved. Upon distillation of the product 142 grams of triethyl phosphate was recovered and further high vacuum distillation of the residue gave 134 g. of product boiling in the tetraethyl phosphate range. Upon refractionation 76 g. of pure tetraethyl pyrophosphate was obtained.

*Example 3*

One-half gram mol of diethyl chlorophosphate and three-fourths mol of triethyl phosphate were mixed as in Example 2 above, and then heated to a temperature of 110–120° C. under a partial vacuum. Under these conditions traces of HCl and some triethyl phosphate were volatilized from the mixture. Distillation of the residue gave 89 grams of triethyl phosphate and then further distillation yielded 92 grams of tetraethyl pyrophosphate. This corresponds to a yield of 63% of theory.

*Example 4*

One-half gram mol of diethyl chlorophosphate and one gram mol of triethyl phosphate were heated at a temperature from 110–140° C. over one hour under a pressure maintained substantially at 50–75 mm. Under these conditions, a gentle reflux was maintained. The product was then heated to 140° C. for three hours under a vacuum of 50 mm. Under these conditions ethyl chloride was evolved. The yield of tetraethyl pyrophosphate was 87% of theory.

*Example 5*

Two mols of triethyl phosphate and two mols of diethyl chlorophosphate were heated under a vacuum varying from 100 mm. to about 25 mm. for two hours, the temperature being maintained at approximately 140° C. Under these conditions, ethyl chloride was formed and removed from the reacting mixture. Unreacted triethyl phosphate was distilled off to give a residue consisting of tetraethyl pyrophosphate in 83% yield.

*Example 6*

Five mols of ethanol was added over a period of two hours to two mols of POCl₃, the temperature during addition being maintained at from 0° to 10° C. While maintaining the temperature of the mixture below 25° C., substantially all of the hydrogen chloride was evolved and then the mixture remaining was heated to 50° for one and one-half hours while under a pressure of 100 mm. Under these conditions ethyl chloride was evolved. The temperature was then raised to 140° C. for two hours while maintaining a pressure of approximately 10 mm. Additional ethyl chloride was liberated and removed from the reaction zone. The residue represented 200 g. of crude tetraethyl pyrophosphate.

Example 7

A solution made up by dissolving two gram mols of a diisobutyl chlorophosphate and one gram mol of triisobutyl phosphate in 500 cc. of xylene is heated to the boiling point of the solution at atmospheric pressure. Isobutyl chloride is evolved together with some xylene. After two mols of isopropyl chloride has been evolved, the balance of xylene is distilled off, leaving as a residue a yellow oil consisting of triisopropyl pentaphosphate.

Example 8

A xylene solution made up of 500 cc. of xylene and containing one gram mol of diethyl chlorophosphate and one gram mol of triisopropyl phosphate is heated to the boiling point of the solution at atmospheric pressure. One gram mol of ethyl chloride is evolved from the reaction mixture together with some xylene. Upon the completion of the evolution of ethyl chloride, the remainder of the xylene is distilled off under vacuum. The residue consists of the mixed ester, diethyl diisopropyl pyrophosphate, which compound is valuable as an insecticide.

Example 9

Three mols of diethyl chlorophosphate and one mol of triethyl phosphate are heated to a temperature of 130° C. for two hours under a vacuum of 50–60 mm. Hg. Three mols of ethyl chloride are evolved as a gas which may be condensed and recovered. The residue remaining in the flask consists of hexaethyl tetraphosphate, a yellow oil which may be employed either as an insecticide or as a plasticizer.

Example 10

A xylene solution containing 650 cc. of xylene, four gram mols of dibutyl chlorophosphate and one gram mol of tributyl phosphate is heated under reflux for two hours. The xylene is distilled off under vacuum, the temperature being maintained below 150° C. during the distillation in order to avoid overheating of the product. The product consists of heptabutyl pentaphosphate.

Example 11

A toluene solution containing 1.000 cc. of toluene, five gram mols of dilauryl chlorophosphate and one gram mol of trihexyl phosphate is heated in a closed vessel to a temperature of about 125° C. to 130° C. Upon distillation under vacuum toluene is first removed and then a mixture of lauryl chloride and hexyl chloride is removed. The residue, a mixed octa (lauryl hexyl) hexaphosphate as a soft brown paste remains in the flask.

Example 12

A solution made by dissolving six gram mols of distearyl chlorophosphate and one gram mol of tristearyl phosphate in 1250 cc. of xylene is heated to the refluxing temperature of the solution, which is approximately 140° C. for three hours. Under a high vacuum the xylene, together with six gram mols of stearyl chloride, is distilled off. The residue, a brown, waxy solid when cold, consists of nonastearyl heptaphosphate. The material may be employed as a plasticizer and lubricating agent for textile fibers.

Example 13

A mixture of two gram mols of diethyl chlorophosphate and one mol of triethyl phosphate was heated to 140° C. in a closed vessel under a vacuum. Two gram mols of ethyl chloride were formed, volatilized and thus removed from the reaction mixture. The product remaining in the reaction vessel was pentaethyl triphosphate, a brown, oily liquid.

The compounds of the present invention may be formulated into insecticidal compositions in any desired form, for example, as dusts, aqueous solutions, or oil in water emulsions. For example, a dust composition may be prepared by applying from 3% to 5% of any of the compounds herein disclosed to an inert carrier such as pyrophyllite by any desired means. The resulting dust can then be applied to plants for the purpose of destroying insect life found thereon, such as aphids and red spiders. The compositions of the present invention may also be dispersed in water in the ratio of 1:200 to 1:800, more or less, and the resulting aqueous dispersions may then be sprayed upon insect infested plants. As an example of a suitable emulsion for insecticidal use, 50 parts of any of the compounds of Examples 1 to 13 may be dispersed in 45 parts of xylene and 5 parts of a non-ionic wetting agent may be added thereto. Illustrative of suitable non-ionic wetting agents for the purpose are the condensation products resulting from the condensation of alkyl phenols with polyethylene glycols. The resulting concentrate may, prior to use, be added to water in the ratio of 1:200 to 1:800, more or less, and the mixture agitated to produce an emulsion. The emulsion may then be applied to the plants for the control and destruction of insect life thereon.

What I claim is:

1. The process which comprises heating a mixture of a dialkyl chlorophosphate and a trialkyl phosphate to a temperature at which alkyl chloride is formed, and recovering an ester of a polyphosphoric acid.

2. The process which comprises heating a solution in an inert solvent of a mixture of a dialkyl chlorophosphate and a trialkyl phosphate at a temperature at which alkyl chloride is formed, and then recovering an ester of a polyphosphoric acid.

3. The process which comprises heating to a temperature at which an alkyl chloride is formed a mixture of a dialkyl chlorophosphate and a trialkyl phosphate, the alkyl groups in said dialkyl chlorophosphate and in said trialkyl phosphate having from 2 to 18 carbon atoms, and recovering an ester of a polyphosphoric acid.

4. The process which comprises heating a mixture of a trialkyl phosphate and a dialkyl chlorophosphate to a temperature at which an alkyl chloride is formed by the reaction between said trialkyl phosphate and said dialkyl chlorophosphate, said reaction occurring between one mol of said trialkyl phosphate and at least one mol of said dialkyl chlorophosphate, and recovering an ester of a polyphosphoric acid.

5. The process which comprises heating a mixture of a trialkyl phosphate and a dialkyl chlorophosphate to a temperature at which an alkyl chloride is formed by the reaction between said trialkyl phosphate and said dialkyl chlorophosphate, said reaction occurring between one mol of said trialkyl phosphate and at least one mol, but not more than 8 mols, of said dialkyl chlorophosphate, and recovering an alkyl ester of a polyphosphoric acid.

6. The process which comprises heating a mixture of a trialkyl phosphate and a dialkyl chlorophosphate to a temperature at which an alkyl chloride is formed by the reaction between said trialkyl phosphate and said dialkyl chlorophosphate, said reaction occurring between one mol of said trialkyl phosphate and one mol of said dialkyl chlorophosphate, and recovering an alkyl ester of pyrophosphoric acid.

7. The process which comprises reacting by means of the application of heat thereto, one mol of a dialkyl chlorophosphate and not less than one mol of trialkyl phosphate, and recovering a tetraalkyl pyrophosphate.

8. The process which comprises reacting together at a temperature above 100° C. and not above 150° C., a mixture containing diethyl chlorophosphate and at least one mol of triethyl phosphate per mol of said diethyl chlorophosphate, whereby ethyl chloride is formed, and recovering tetraethyl pyrophosphate.

9. The process which comprises heating a mixture of a trialkyl phosphate and a dialkyl chlorophosphate to a temperature at which an alkyl chloride is formed by the reaction between said trialkyl phosphate and said dialkyl chlorophosphate, said reaction occurring between one mol of said trialkyl phosphate and two mols of dialkyl chlorophosphate, and recovering a pentaalkyl triphosphate.

10. The process which comprises reacting together at a temperature above 100° C. and not above 150° C. a mixture containing triethyl phosphate and at least two mols of diethyl chlorophosphate per mol of said triethyl phosphate, whereby ethyl chloride is formed, and recovering pentaethyl triphosphate.

11. The process which comprises heating a mixture of a trialkyl phosphate and a dialkyl chlorophosphate to a temperature at which an alkyl chloride is formed by the reaction between said trialkyl phosphate and said dialkyl chlorophosphate, said reaction occurring between one mol of said trialkyl phosphate and three mols of said dialkyl chlorophosphate, and recovering a hexaalkyl tetraphosphate.

12. The process which comprises reacting together at a temperature above 100° C. and not above 150° C. a mixture containing triethyl phosphate and at least three mols of diethyl chlorophosphate per mol of said triethyl phosphate, whereby ethyl chloride is formed, and recovering hexaethyl tetraphosphate.

GENNADY M. KOSOLAPOFF.

REFERENCES CITED

The following references are of record in the file of this patent:

UNITED STATES PATENTS

| Number | Name | Date |
|---|---|---|
| 2,336,302 | Schrader | Dec. 7, 1943 |
| 2,402,703 | Woodstock | June 25, 1946 |

OTHER REFERENCES

Adler et al., "Chemical Industries," vol. 51, pages 516–519.

Balarew, "Zeit. Anorg. Allgem. Chem.," vol. 99, pages 187–189 (1917).